United States Patent
Miyake

(10) Patent No.: US 8,122,720 B2
(45) Date of Patent: Feb. 28, 2012

(54) FUEL NOZZLE APPARATUS, GAS TURBINE, AND METHOD OF CONTROLLING FUEL NOZZLE APPARATUS

(75) Inventor: Yoshiaki Miyake, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 865 days.

(21) Appl. No.: 12/010,393

(22) Filed: Jan. 24, 2008

(65) Prior Publication Data

US 2009/0008474 A1    Jan. 8, 2009

(30) Foreign Application Priority Data

Feb. 28, 2007  (JP) ................. 2007-050016

(51) Int. Cl.
*F02C 1/00*  (2006.01)
*F02G 3/00*  (2006.01)
(52) U.S. Cl. .............. 60/740; 60/742; 239/125
(58) Field of Classification Search ........... 60/740–742, 60/746–747, 734, 776, 39.281, 39.48; 239/124–126
See application file for complete search history.

(56) References Cited

U.S. PATENT DOCUMENTS

| | | | | |
|---|---|---|---|---|
| 3,547,093 A | * | 12/1970 | Sherman | 123/179.21 |
| 4,546,921 A | * | 10/1985 | McCormack | 239/125 |
| 5,823,443 A | * | 10/1998 | Cooper et al. | 239/533.9 |
| 6,286,480 B1 | * | 9/2001 | Chen et al. | 123/380 |
| 6,729,135 B1 | * | 5/2004 | Norris et al. | 60/646 |
| 6,779,268 B1 | * | 8/2004 | Farmer | 29/890.01 |

FOREIGN PATENT DOCUMENTS

| | | |
|---|---|---|
| EP | 0 391 609 | 10/1990 |
| GB | 1 420 314 | 1/1976 |
| JP | 49-45220 | 4/1974 |
| JP | 62-203931 | 9/1987 |
| JP | 3-130538 | 6/1991 |
| JP | 11-210492 | 8/1999 |

* cited by examiner

*Primary Examiner* — Ehud Gartenberg
*Assistant Examiner* — Andrew Nguyen
(74) *Attorney, Agent, or Firm* — Wenderoth, Lind & Ponack, L.L.P.

(57) ABSTRACT

There are provided a fuel nozzle apparatus, a gas turbine, and a method of controlling a fuel nozzle apparatus, that prevent an occurrence of caulking while meeting the requirements of exhaust gas regulations. There are provided: a fuel pump that feeds fuel; a fuel flow passage formed with a circulation flow passage through which the fuel flows; a flow controller that controls a flow rate of the fuel flowing from the fuel pump into the circulation flow passage; a circulation pump that circulates the fuel within the circulation flow passage; a nozzle section formed with an injection nozzle that injects the fuel from the circulation flow passage to the outside; and an injection controller that controls an injection amount of the fuel to be injected from the injection nozzle.

10 Claims, 9 Drawing Sheets

FUEL NOZZLE APPARATUS, GAS TURBINE, AND METHOD OF CONTROLLING FUEL NOZZLE APPARATUS

BACKGROUND OF THE INVENTION

1. Field of the Invention

The present invention relates to a fuel nozzle apparatus, a gas turbine, and a method of controlling the fuel nozzle apparatus, that are suitably used for an aircraft for example.

This application is based on Japanese Patent Application No. 2007-050016, the content of which is incorporated herein by reference.

2. Description of Related Art

Due to recent exhaust gas regulations, it is required also in a gas turbine or the like to suppress the concentration of NOx contained in the exhaust gas.

In order to meet this requirement, there have been proposed various techniques for suppressing NOx concentration in a gas turbine to be used in a plant (for example, refer to Japanese Unexamined Patent Application, Publication No. Hei 11-210492).

Lean combustion is one example of a method of suppressing the concentration of NOx contained in exhaust gas mentioned above. However, simply reducing the amount of fuel to be injected from a fuel nozzle into a combustor of a gas turbine causes unstable fuel combustion, and does not allow a predetermined ability of the gas turbine to be demonstrated.

Consequently, there has been carried out a staging in which fuel injection in some of the fuel nozzles among a plurality of fuel nozzles is stopped and fuel is injected from the remaining fuel nozzles, thereby realizing lean combustion and stable fuel combustion for the overall-gas turbine.

In general, a fuel nozzle is in contact with high-temperature and high-pressure gas (for example, compressed air) flowing therearound, and furthermore, it is exposed to a high level of radiation heat generated from combustion within the combustor.

A fuel nozzle from which fuel is injected is cooled down by the fuel flowing inside the fuel nozzle. Therefore, the temperature of the fuel nozzle itself does not rise much and continuous fuel injection is possible.

On the other hand, in a fuel nozzle where fuel injection from the fuel nozzle has been stopped, the flow of fuel that cools down the fuel nozzle stops. Therefore the temperature of the fuel nozzle itself rises. In the fuel used for a gas turbine, when the temperature of the fuel exceeds a predetermined temperature (for example, approximately 170° C.), a carbonization reaction starts to occur. Therefore, there is a possibility of carbonated fuel causing clogging (hereinafter, referred to as caulking) in the fuel nozzle.

Also at the time of soak back immediately after the gas turbine is stopped, that is, at the time when fuel injection from the fuel nozzle is stopped and heat of the combustor has been transmitted to the fuel nozzle, the above mentioned caulking is likely to occur in the fuel nozzle.

Conventionally, in order to prevent caulking, the gas turbine is stopped after carrying out an idle operation and the temperature of the gas turbine has been thereby reduced, or there is provided a fuel purging mechanism for removing fuel from the fuel nozzle.

SUMMARY OF THE INVENTION

The present invention has been achieved to solve the above problems, and its object is to provide a fuel nozzle apparatus, a gas turbine, and a method of controlling the fuel nozzle apparatus, that can prevent an occurrence of caulking while meeting the requirements of the exhaust gas regulations.

In order to achieve the above object, the present invention provides the following solutions.

A first aspect of the present invention provides a fuel nozzle apparatus comprising: a fuel pump that feeds fuel; a fuel flow passage formed with a circulation flow passage through which the fuel flows; a flow controller that controls a flow rate of the fuel flowing from the fuel pump into the circulation flow passage; a circulation pump that circulates the fuel within the circulation passage; a nozzle section formed with an injection nozzle that injects the fuel from the circulation flow passage to the outside; and an injection controller that controls the injection amount of the fuel to be injected from the injection nozzle.

According to the first aspect of the present invention, the fuel is circulated into the circulation flow passage by the circulation pump. By circulating the fuel, a rise in fuel temperature to a temperature at which carbonization of the fuel starts to occur can be prevented. Therefore, an occurrence of caulking in the fuel nozzle apparatus can be prevented.

In particular, in the case where fuel injection from the injection nozzle is stopped by the injection controller, carbonization of the fuel is prevented, thereby preventing an occurrence of caulking, whereas carbonization of the fuel can easily occur if the fuel is not circulated.

For example, fuel injection may be stopped in the case of staging for carrying out lean combustion where fuel injection is stopped in some of the plurality of the fuel nozzle apparatuses while the gas turbine engine is operated, or in the case where the operation of the gas turbine engine is stopped.

In the first aspect of the invention, preferably the configuration is such that the injection controller changes a flow passage area for the fuel flowing into the injection nozzle, on the basis of a pressure difference between a pressure within the circulation flow passage and a pressure outside the injection nozzle, thereby controlling an injection amount of the fuel.

Thus, the injection controller controls an amount of fuel injection based only on a pressure difference. Therefore, the configuration of the injection controller can be simplified. Accordingly, compared to a method of controlling an amount of fuel injection with use of an actuator or the like, the size and the weight of the fuel nozzle apparatus can be reduced and the heat resistance property of the injection controller can be improved.

In the above configuration, preferably the injection controller comprises a valve element arranged in between the circulation flow passage and the injection nozzle, and the valve element moves to the circulation flow passage side or the injection nozzle side based on a pressure difference between a pressure within the circulation flow passage and a pressure outside the injection nozzle, thereby changing a flow passage area for the fuel flowing into the injection nozzle.

Thus, in the case where the pressure of the fuel within the circulation flow passage is lower than the pressure outside the injection nozzle, the valve element is pulled towards the circulation flow passage side due to the pressure difference. On the other hand, in the case where the pressure of the fuel within the circulation flow passage is higher than the pressure outside the injection nozzle, the valve element is pushed towards the injection nozzle side due to the pressure difference mentioned above.

By making use of these movements of the valve element, the flow passage area for the fuel flowing into the injection nozzle can be changed.

In the above configuration, preferably the injection controller comprises a valve element arranged in between the circulation flow passage and the injection nozzle, and the valve element moves to the circulation flow passage side and the injection nozzle side based on a pressure difference between a pressure within the circulation flow passage and a pressure outside the injection nozzle, thereby changing a flow passage area for the fuel flowing into the injection nozzle; the circulation flow passage adjacent to the valve element comprises a throat section in which a flow passage area becomes narrower, and a pressure within the throat section is controlled by a flow rate of the fuel flowing into the circulation flow passage and a flow rate of the fuel circulating in the circulation flow passage.

Thus, since the flow passage area in the throat section is narrow, if fuel is circulated within the circulation flow passage in a state where new fuel is not being supplied into the circulation flow passage, the pressure of the fuel within the throat section can be made lower than the pressure outside the injection nozzle. On the other hand, if new fuel is supplied into the circulation flow passage, the pressure of the fuel within the throat section can be made higher than the pressure outside the injection nozzle regardless of whether fuel circulation is being carried out.

Therefore, the pressure within the throat section can be controlled by controlling the flow rate of the fuel flowing into the circulation flow passage and the flow rate of the fuel circulating in the circulation flow passage. As a result, movement of the valve element can be controlled.

In the above configuration, preferably the injection controller comprises a valve element arranged in between the circulation flow passage and the injection nozzle, and the valve element moves to the circulation flow passage side and the injection nozzle side based on a pressure difference between a pressure within the circulation flow passage and a pressure outside the injection nozzle, thereby changing a flow passage area for the fuel flowing into the injection nozzle; the circulation flow passage adjacent to the valve element comprises a throat section in which a flow passage area becomes narrower, and a pressure within the throat section is controlled based on a flow rate of the fuel flowing into the circulation flow passage and a flow rate of the fuel circulating in the circulation flow passage; the circulation flow passage comprises two cylindrical flow passages, namely an inside flow passage and an outside flow passage, connected to the throat section, and radiuses of these are different from each other; the injection nozzle is arranged so as to oppose to the throat section; and between the throat section and the injection nozzle, there is arranged the valve element of a toroidal shape with a cross-section of a substantially circular shape.

Thus, the circulation pump circulates the fuel via the throat section between the inside flow passage and the outside flow passage. By circulating the fuel, a rise in fuel temperature to a temperature at which carbonization of the fuel starts to occur can be prevented.

The valve element is moved to the throat section side and the injection nozzle side due to the pressure difference between the pressure within the throat section and the pressure outside the injection nozzle. Since the valve element is formed in a toroidal shape, it is unlikely to move in its radial direction, and a flow passage for fuel flowing into the injection nozzle can be easily formed.

In the above configuration, preferably the circulation flow passage is formed by connecting a cylindrical outside flow passage with an inside flow passage arranged inside of the cylindrical flow passage; the flow controller comprises a primary flow control valve that controls a flow rate of the fuel flowing into the inside flow passage, and a secondary flow control valve that controls a flow rate of the fuel flowing into the cylindrical flow passage; the nozzle section comprises a primary injection nozzle that communicates with the inside flow passage, and a primary injection nozzle that communicates with the outside flow passage; the injection controller comprises a primary valve element arranged in between the primary injection nozzle and the inside flow passage, and a secondary valve element arranged in between the secondary injection nozzle and the outside flow passage, and the primary valve element moves to the cylindrical flow passage side and the primary injection nozzle side based on a pressure difference between a pressure within the cylindrical flow passage and a pressure outside the primary injection nozzle, thereby changing a flow passage area for the fuel flowing into the primary injection nozzle, and the secondary valve element moves to the inside flow passage side or the secondary injection nozzle side based on a pressure difference between a pressure within the inside flow passage and a pressure outside the secondary injection nozzle, thereby changing a flow passage area for the fuel flowing into the secondary injection nozzle.

Thus, the fuel is circulated between the outside flow passage and the inside flow passage. By circulating the fuel, a rise in fuel temperature to a temperature at which carbonization of the fuel starts to occur can be prevented.

In the case where the pressure of the fuel within the inside flow passage is lower than the pressure outside the primary injection nozzle, the primary valve element is pulled towards the inside flow passage side due to the pressure difference. On the other hand, in the case where the pressure of the fuel within the inside flow passage is higher than the pressure outside the primary injection nozzle, the primary valve element is pushed towards the primary injection nozzle side due to the pressure difference mentioned above.

On the other hand, in the case where the pressure of the fuel within the outside flow passage is lower than the pressure outside the secondary injection nozzle, the secondary valve element is pulled towards the outside flow passage side due to the pressure difference. On the other hand, in the case where the pressure of the fuel within the outside flow passage is higher than the pressure outside the secondary injection nozzle, the secondary valve element is pushed towards the secondary injection nozzle side due to the pressure difference.

By making use of these movements of the primary valve element and the secondary valve element, the flow passage area for the fuel flowing into the primary injection nozzle and the secondary injection nozzle can be changed.

In the above configuration, preferably the circulation flow passage is formed by connecting a cylindrical outside flow passage with an inside flow passage arranged inside of the cylindrical flow passage; the flow controller comprises a primary flow control valve that controls a flow rate of the fuel flowing into the inside flow passage, and a secondary flow control valve that controls a flow rate of the fuel flowing into the cylindrical flow passage; the nozzle section comprises a primary injection nozzle that communicates with the inside flow passage, and a primary injection nozzle that communicates with the outside flow passage; the injection controller comprises a primary valve element arranged in between the primary injection nozzle and the inside flow passage, and a secondary valve element arranged in between the secondary injection nozzle and the outside flow passage, and the primary valve element moves to the cylindrical flow passage side and the primary injection nozzle side based on a pressure difference between a pressure within the cylindrical flow passage and a pressure outside the primary injection nozzle, thereby changing a flow passage area for the fuel flowing into the primary injection nozzle, and the secondary valve element moves to the inside flow passage side and the secondary injection nozzle side based on a pressure difference between a pressure within the inside flow passage and a pressure outside the secondary injection nozzle, thereby changing a flow passage area for the fuel flowing into the secondary injection nozzle; between the primary valve element and the inside flow passage there is a primary throat section in which a flow passage area becomes narrower; between the secondary valve element and the outside flow passage there is a secondary throat section in which a flow passage area becomes narrower; a pressure within the primary throat section is controlled based on a flow rate of the fuel flowing into the inside flow passage and a flow rate of the fuel circulating within the circulation flow passage; and a pressure within the secondary throat section is controlled based on a flow rate of the fuel flowing into the outside flow passage and a flow rate of the fuel circulating within the circulation flow passage.

Thus, since the flow passage area in the primary throat section is narrow, if fuel is circulated between the inside flow passage and the outside flow passage in a state where fuel is not being supplied from the fuel pump into the inside flow passage, the pressure of the fuel within the primary throat passage becomes lower than the pressure outside the primary injection nozzle. On the other hand, if the fuel is supplied from the fuel pump into the inside flow passage, the pressure of the fuel in the primary throat section becomes higher than the pressure outside the primary injection nozzle regardless of whether fuel circulation is being carried out.

Therefore, the pressure within the primary throat section can be controlled by controlling the flow rate of the fuel flowing into the inside flow passage and the flow rate of the fuel circulating between the inside flow passage and the outside flow passage. Accordingly, movement of the valve element can be controlled.

On the other hand, since the flow passage area in the secondary throat section is narrow, if fuel is circulated between the inside flow passage and the outside flow passage in a state where fuel is not being supplied from the fuel pump into the outside flow passage, the pressure of the fuel within the secondary throat section becomes lower than the pressure outside the secondary injection nozzle. On the other hand, if the fuel is supplied from the fuel pump into the outside flow passage, the pressure of the fuel in the secondary throat section becomes higher than the pressure outside the secondary injection nozzle regardless of whether fuel circulation is being carried out.

Accordingly, the pressure within the secondary throat section can be controlled by controlling the flow rate of the fuel flowing into the outside flow passage and the flow rate of the fuel circulating between the outside flow passage and the inside flow passage. As a result, movement of the valve element can be controlled.

In the first aspect of the invention, preferably the circulation flow passage comprises a cooling section that cools down the fuel flowing inside the circulation flow passage.

Thus, by lowering the temperature of the fuel flowing through the circulation flow passage, carbonization of the fuel, and an occurrence of caulking can be prevented.

A second aspect of the present invention provides a gas turbine comprising: a compressor section that compresses air; a combustion section comprising a fuel nozzle apparatus according to the first aspect of the invention, that injects fuel into the compressed air, and that combusts the injected fuel therein; and a turbine section that extracts a rotational force from combustion gas and rotationally drives the compressor section.

According to the second aspect of the present invention, since there is provided the fuel nozzle apparatus according to the first aspect of the present invention, an occurrence of caulking in the fuel nozzle apparatus can be prevented while carrying out staging to reduce the concentration of NOx and so forth contained in the gas discharged from the gas turbine.

Even if the gas turbine is stopped without carrying out an idle operation thereof, an occurrence of caulking can be prevented.

A third aspect of the present invention provides a method of controlling a fuel nozzle apparatus comprising: a circulation flow passage into which fuel is externally supplied, and which is configured so as to enable circulation of the supplied fuel; an injection nozzle that communicates with the circulation flow passage and injects the fuel within the circulation flow passage towards the outside; and an injection controller that is arranged in between the circulation flow passage and the injection nozzle so as to change a flow passage area for fuel flowing into the injection nozzle due to a pressure difference between a pressure within the circulation flow passage and a pressure outside the injection nozzle, the method comprising: a supplying step for controlling fuel supply into the circulation flow passage; and a circulating step for controlling circulation of the fuel within the circulation flow passage.

According to the third aspect of the present invention, the pressure within the circulation flow passage is made higher than the pressure outside the injection nozzle by supplying fuel into the circulation flow passage and stopping fuel circulation within the circulation flow passage. As a result, the supplied fuel can be injected from the injection nozzle.

On the other hand, by supplying fuel into the circulation flow passage and carrying out fuel circulation within the circulation flow passage, the pressure within the circulation flow passage is made higher than the pressure outside the injection nozzle. As a result, a part of the supplied fuel can be injected from the injection-nozzle and the remaining fuel can be circulated within the circulation flow passage.

Furthermore, by stopping fuel supply into the circulation flow passage and carrying out fuel circulation within the circulation flow passage, the pressure within the circulation flow passage is made lower than the pressure outside the injection nozzle, fuel injection is stopped, and the fuel can be thereby circulated within the circulation flow passage.

In any one of these cases, since the fuel flows within the circulation flow passage, a rise in fuel temperature can be prevented, and an occurrence of caulking can be prevented.

According to the fuel nozzle apparatus of the first aspect, the gas turbine of the second aspect, and the method of controlling a fuel nozzle apparatus of the third aspect of the present invention, by circulating the fuel, a rise in fuel temperature to a temperature at which carbonization of the fuel starts to occur can be prevented. As a result, there is achieved an effect such that caulking in the fuel nozzle apparatus can be prevented, while carrying out staging to reduce the concentration of NOx and so forth contained in the gas discharged from the gas turbine to meet the requirements of the exhaust gas regulations.

DETAILED DESCRIPTION OF THE INVENTION

First Embodiment

Hereinafter, a gas turbine engine according to a first embodiment of the present invention is described, with reference to FIG. 1 to FIG. 6.

Figure 1:
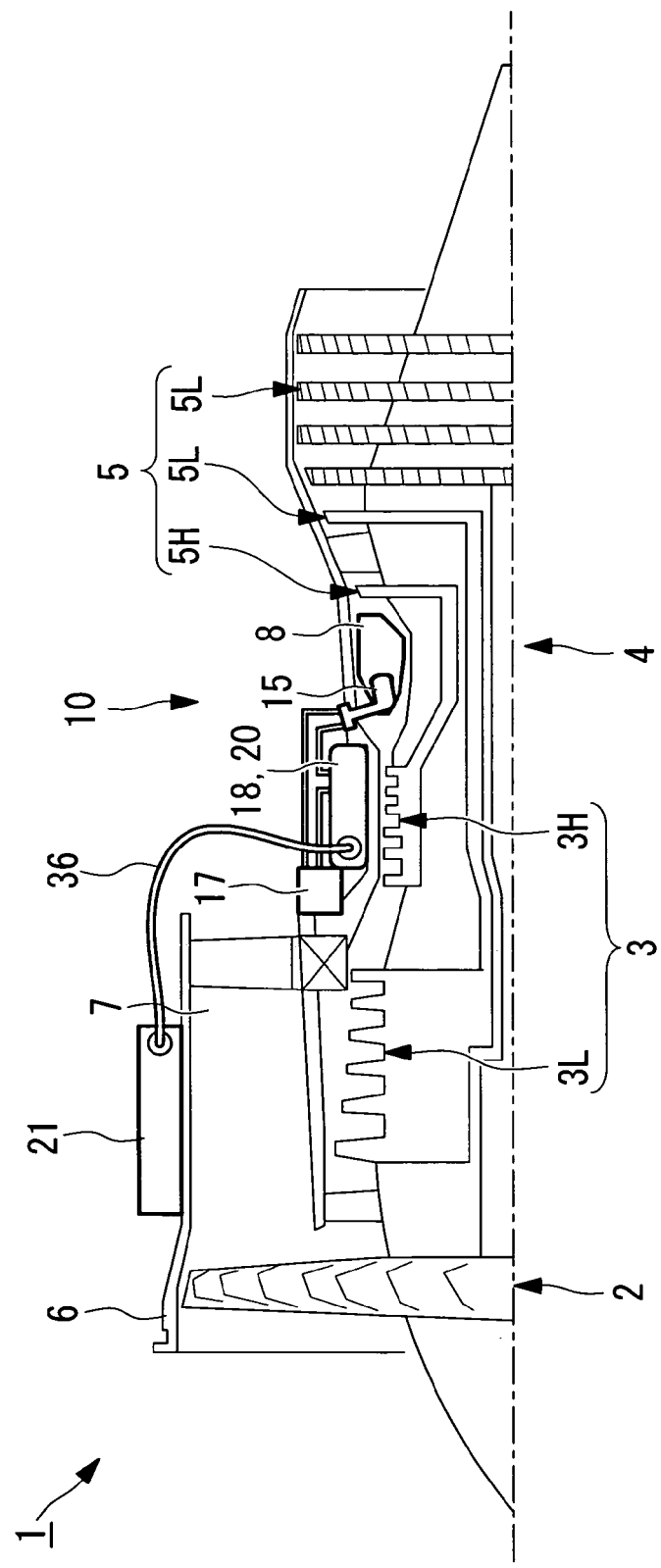
FIG. 1 is a schematic drawing for explaining an overview of a gas turbine engine according to a first embodiment of the present invention.

FIG. 1 is a schematic drawing for explaining an overview of the gas turbine engine of the present embodiment.

The present embodiment is described as an application of the present invention to a gas turbine engine for an aircraft.

In a gas turbine engine (gas turbine) 1 there are; a fan section 2, a compressor section 3 that compresses air, a combustion section 4 that combusts compressed air by injecting fuel into the compressed air to generate high-temperature and high-pressure combustion gas, and a turbine section 5 that extracts a rotational driving force from the combustion gas and transmits the rotational driving force to the compressor section 3.

The fan section 2 is rotationally driven, thereby taking in air from in front of the gas turbine engine 1 (left direction in FIG. 1) and guiding a part of the air to the compressor section 3, and making the remaining air bypass the compressor section 3 and be directly discharged to the rear side of the gas turbine engine 1 (right direction in FIG. 1). The fan section 2 is on the same rotating shaft as a low pressure turbine 5L, and is configured so as to be rotationally driven by the low pressure turbine 5L.

Around the fan section 2 there is arranged a cylindrical ring section 6, and the fan section 2 is covered by the ring section 6. Between the fan section 2 and the compressor section 3 there is configured a bypass duct 7 through which bypassed air flows.

The compressor section 3 comprises a low pressure compressor 3L and a high pressure compressor 3H in this order from the front side of the gas turbine engine 1 (left side of FIG. 1). The low pressure compressor 3L and the high pressure compressor 3H are configured as axial flow type compressors for respectively raising the pressure of the inflowing air to a predetermined pressure.

The low pressure compressor 3L is rotationally driven, thereby taking in a part of the air that has passed through the fan section 2 and raising the pressure thereof to a predetermined pressure. The low pressure compressor 3L is on the same rotating shaft as the low pressure turbine 5L, and is configured so as to be rotationally driven by the low pressure turbine 5L.

The high pressure compressor 3H is rotationally driven, thereby taking in the air compressed in the low pressure compressor 3L and raising the pressure thereof to a further higher pressure. The high pressure compressor 3H is on the same rotating shaft as a high pressure turbine 5H, and is configured so as to be rotationally driven by the high pressure turbine 5H.

Figure 2:
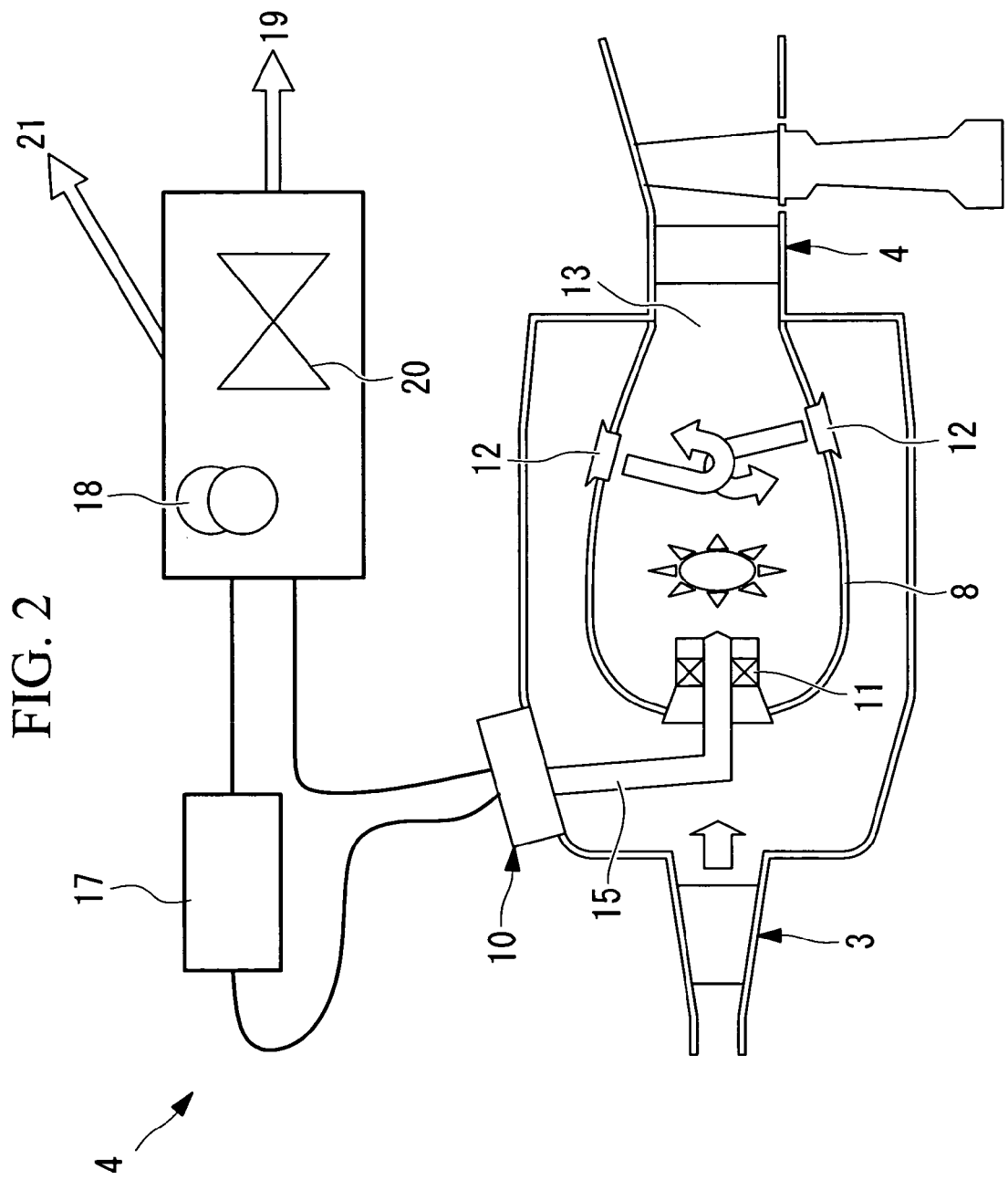
FIG. 2 is a schematic drawing for explaining a configuration of a combustion section in FIG. 1.

FIG. 2 is a schematic drawing for explaining a configuration of the combustion section in FIG. 1.

The combustion section 4 is arranged in between the compressor section 3 and the turbine section 5 as shown in FIG. 1 and FIG. 2. The air compressed by the compressor section 3 flows into the combustion section 4, and generated combustion gas is discharged into the turbine section 5.

As shown in FIG. 2, the combustion section 4 comprises a combustor 8 inside which fuel is combusted, and a fuel nozzle apparatus 10 that injects fuel into the combustor 8.

Fuel is injected from a fuel nozzle 15 that is arranged in a compressor section 3 side end section, into the interior of the combustor 8 to internally combust the fuel.

The combustor 8 comprises; a diffuser section 11 for forming an air flow that diffuses the injected fuel, attenuating air inlets 12 through which air flows in from the side faces of the combustor 8, and a discharge outlet 13 for discharging combustion gas towards the turbine section 5.

The diffuser section 11 is arranged in the compressor section 3 side end section in the combustor 8 and around the fuel nozzle 15, and a part of the air that flows into the interior of the combustor 8 passes through the diffuser section 11. The air that has passed through the diffuser section 11 diffuses the air injected from the fuel nozzle 15, promoting evaporation. A swirling air flow may be taken as an example of the flow for diffusing the fuel, and a swirl vane may be taken as an example of the diffuser section 11 for forming such an air flow.

The attenuating air inlets 12 are through holes formed in the side faces of the combustor 8 and they guide a part of the air flowing outside the combustor 8 into the interior of the combustor 8.

The air that has flowed in through the attenuating air inlets 12 attenuates the combustion gas generated as a result of fuel combustion, and promotes recombustion of combustible substances contained in the combustion gas. Furthermore, the attenuating air inlets 12 control the air flow within the combustor 8, creating a flow that enables stable fuel combustion.

Figure 3:
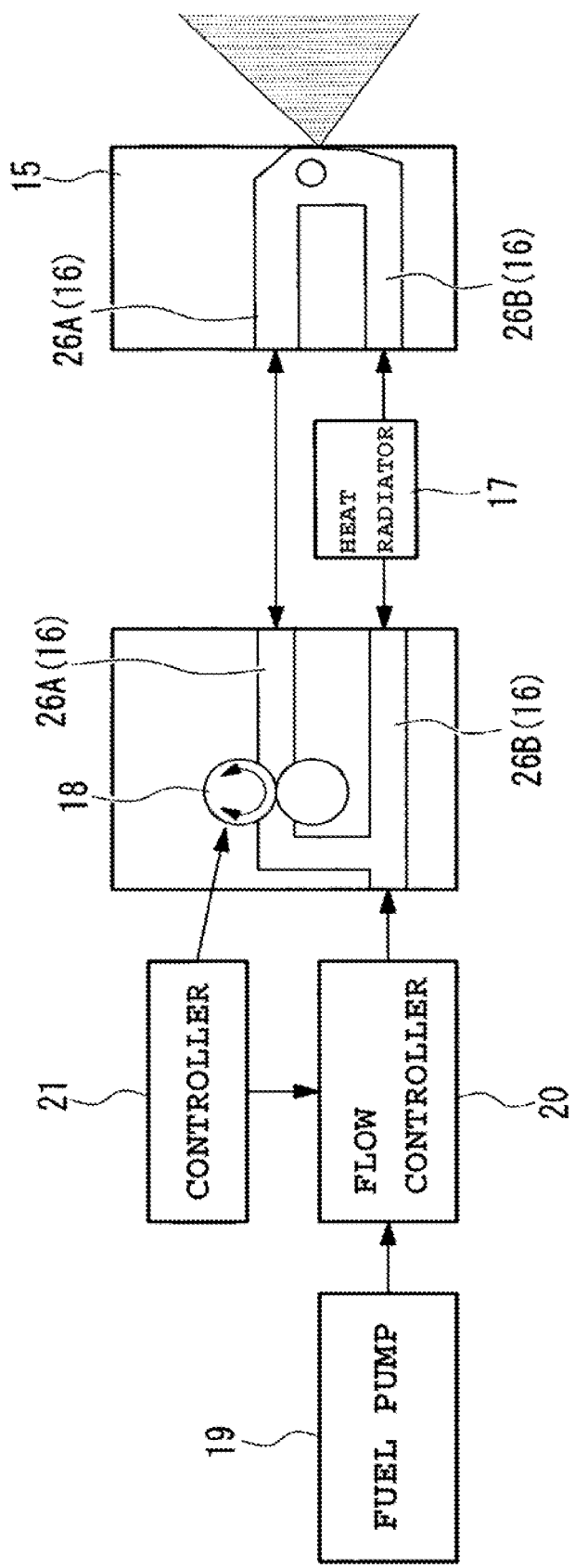
FIG. 3 is a schematic drawing for explaining an overview of a fuel nozzle apparatus in FIG. 2.

FIG. 3 is a schematic drawing for explaining an overview of the fuel nozzle apparatus in FIG. 2.

As shown in FIG. 1 to FIG. 3, the fuel nozzle apparatus 10 comprises; the fuel nozzles 15, a circulation flow passage 16, a heat radiator (heat radiator section) 17, a circulation pump 18, a fuel pump 19, a flow control valve (flow controller) 20, and a controller (FADEC: Full Authorized Digital Electric Controller) 21.

Figure 4:
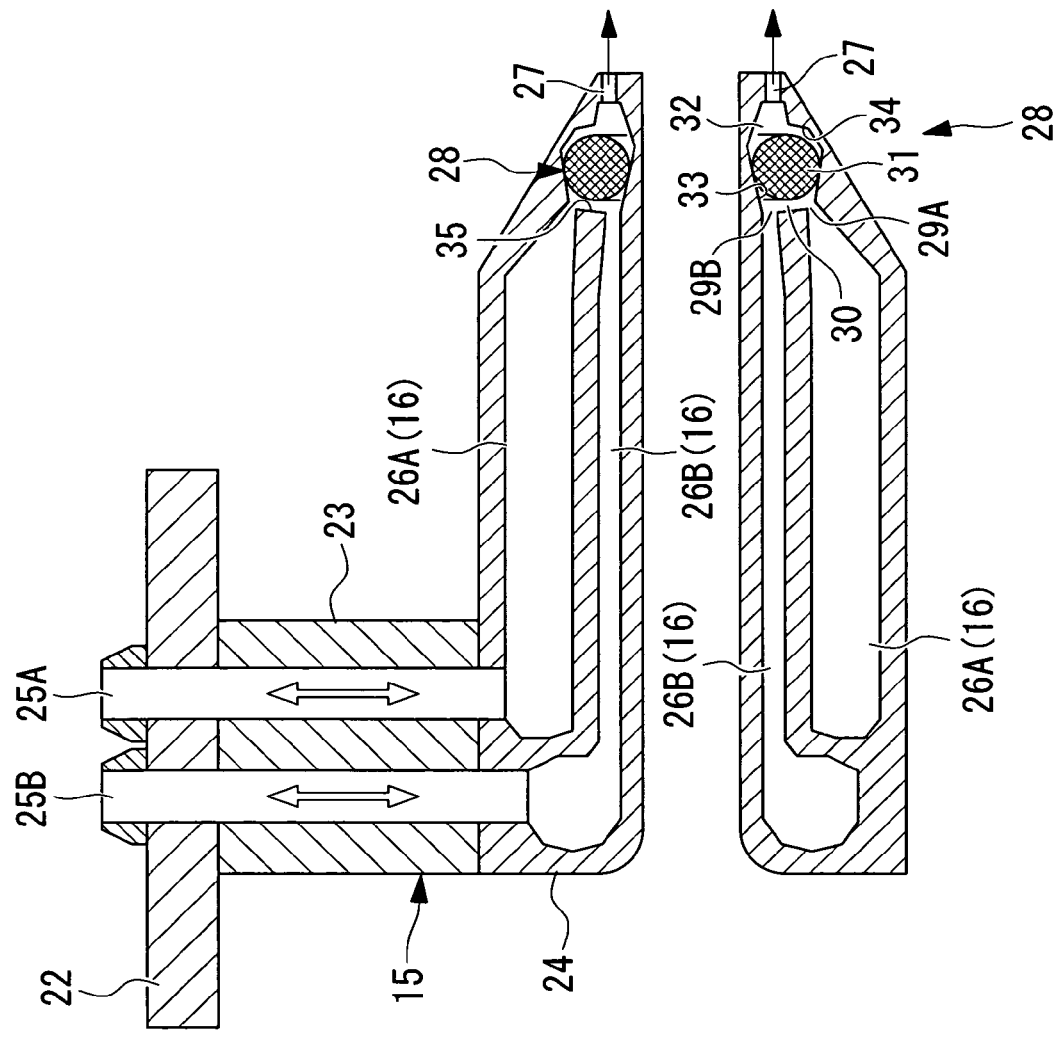
FIG. 4 is a schematic drawing for explaining a configuration of the fuel nozzle in FIG. 3.

FIG. 4 is a schematic drawing for explaining a configuration of the fuel nozzle in FIG. 3.

As shown in FIG. 1, a plurality of the fuel nozzles 15 are arranged at even intervals on the circumference around the central axis of the gas turbine engine 1.

As shown in FIG. 4, the fuel nozzle 15 comprises; a nozzle flange 22 serving as an attachment section, a nozzle stay 23 that joins the nozzle flange 22 to a nozzle main body 24, and the nozzle main body (nozzle section) 24 formed in a cylindrical shape.

The nozzle flange 22 is a plate shaped member that fixes the fuel nozzle 15 to the gas turbine engine 1.

The nozzle flange 22 comprises; a piping port 25A that communicates with an outside flow passage 26A of the nozzle main body 24, and a piping port 25B that communicates with an inside flow passage 26B.

The nozzle main body 24 is a member formed in a cylindrical shape, and is a member that is attached via the nozzle stay 23 to the nozzle flange 22.

The nozzle main body 24 comprises; the outside flow passage (circulation flow passage, fuel passage) 26A and the inside flow passage (circulation flow passage, fuel passage) 26B through which fuel travels, an injection nozzle 27 that injects the fuel into the combustor 8, and an injection controller 28 that controls fuel injection.

The downstream side (left side in FIG. 4) end section on the outer circumferential face of the nozzle main body 24 is an inclined face that approaches the central axis of the nozzle main body 24 towards the downstream side.

The outside flow passage 26A is a cylindrical flow passage arranged outside of the inside flow passage 26B, and it, together with the inside flow passage 26B, forms the circulation flow passage 16. On the other hand, the inside flow passage 26B is a cylindrical flow passage arranged inside of the outside flow passage 26A, and it, together with the outside flow passage 26A, forms the circulation flow passage 16.

The outside flow passage 26A and the inside flow passage 26B, in the end section on the downstream side of the nozzle main body 24 (right side in FIG. 4), are communicated with each other by an opening section 29A, a throat section 30, and an opening section 29B.

The injection nozzle 27 is a hole formed in a downstream side end face of the nozzle main body 24, and the fuel is injected therethrough. The injection nozzle 27 is in a position in close proximity to the inner circumferential face of the nozzle main body 24, and is arranged so that the fuel that has traveled through the inside flow passage 26B flows thereinto via the opening section 29B and a valve chamber 32.

The injection controller 28 comprises a built-in valve (valve element) 31 that changes the flow passage area for the fuel flowing into the injection nozzle 27, and the valve chamber 32.

The valve chamber 32 internally houses the built-in valve 31, and forms a flow passage that links the opening section 29A, the throat section 30, and the opening section 29B to the injection nozzle 27.

The built-in valve 31 is a member formed in a toroidal shape with a cross-section of a substantially circular shape, and is a member formed from a metallic material.

An inner circumferential face 33 serving as a face on the central axis side of the nozzle main body 24 in the valve chamber 32, is formed at an incline so as approach the central axis side towards the downstream side of the nozzle main body 24. In the downstream side end section of the nozzle main body 24 in the valve chamber 32, there is formed a contact face 34 that regulates movement of the built-in valve 31. In the valve chamber 32 there is ensured a space within which the built-in valve 31 is able to move in a direction along the central axis of the nozzle main body 24.

The valve chamber 32 may comprise a guide section that makes the built-in valve 31 move in parallel with the central axis of the nozzle main body 24, but the configuration is not particularly limited to this.

The opening section 29A is a flow passage that links the outside flow passage 26A and the throat section 30, and the opening section 29B is a flow passage that links the inside flow passage 26B, the valve chamber 32, and the throat section 30.

The throat section 30 is a flow passage formed by a wall section 35 that separates the outside flow passage 26A and the inside flow passage 26B, and the built-in valve 31, and one of the end sections thereof links to the opening section 29A and the other end section links to the opening section 29B and the valve chamber 32.

As shown in FIG. 2 and FIG. 3, the heat radiator 17 is a heat radiator that radiates heat of the fuel circulating in the circulation flow passage 16 into the air flowing through the bypass duct 7.

As shown in FIG. 3, the fuel pump 19 raises the pressure of the fuel flowed in from a fuel tank (not shown in the drawing), and supplies the fuel via the flow control valve 20 into the circulation flow passage 16.

As shown in FIG. 3, the circulation pump 18 is a pump that controls fuel circulation based on control signals inputted from the controller 21, and is arranged in the circulation flow passage 16. A commonly known pump such as an electrically operated screw pump that controls the flow rate based on electric control signals, may be used as the circulation pump 18, but the configuration is not particularly limited to this.

As shown in FIG. 3, the flow control valve 20 is a valve that controls the flow rate of the fuel which has been raised in pressure by the fuel pump 19, and flows into the circulation flow passage 16. The flow control valve 20 is controlled based on control signals inputted from the controller 21 so as to control the flow rate of the fuel that passes through the flow control valve 20 regardless of the outlet pressure thereof. The fuel that has passed through the flow control valve 20 flows into between the circulation pump 18 and the inside flow passage 26B.

A commonly known control valve such as an electric type flow control valve that controls flow rate based on electric control signals, may be used as the flow control valve 20, but the configuration is not particularly limited to this.

As shown in FIG. 1 and FIG. 3, the controller 21 is arranged on the ring section 6 so as to control the flow control valve 20 and the circulation pump 18 that are connected via a wiring harness 36.

As shown in FIG. 1, the turbine section 5 comprises; the high pressure turbine 5H into which the combustion gas discharged from the combustion section 4 flows, and the low pressure turbine 5L into which the combustion gas flowing in from the high pressure turbine 5H flows.

The high pressure turbine 5H is rotationally driven by the combustion gas flowing in from the combustion section 4, and it rotationally drives the high pressure compressor 3H on the same rotating shaft.

The low pressure turbine 5L is rotationally driven by the combustion gas flowing in from the high pressure turbine 5H, and it rotationally drives the low pressure compressor 3L on the same rotating shaft.

Next, an overview of an operation of the gas turbine engine 1 of the above configuration is described.

As shown in FIG. 1, the fan section 2 rotationally driven by the low pressure turbine 5L pushes air from the front to the rear of the gas turbine engine 1. A part of the air that has been pushed to the rear by the fan section 2 flows into the low pressure compressor 3L, and the remaining air travels through the bypass duct 7 and is pushed to the rear of the gas turbine engine 1.

The low pressure compressor 3L is rotationally driven by the low pressure turbine 5L so as to compress the air that has flowed thereinto, to a predetermined pressure. The compressed air flows from the low pressure compressor 3L into the high pressure compressor 3H. The high pressure compressor 3H is rotationally driven by the high pressure turbine 5H so as to compress the air that has flowed thereinto, to a further higher predetermined pressure. The high-temperature and high-pressure air that has been compressed flows from the high pressure compressor 3H into the combustion section 4.

As shown in FIG. 2, a part of the high-temperature and high-pressure air that has flowed into the combustion section 4, flows into the interior of the combustor 8 and is mixed with the fuel injected from the fuel nozzle 15 to be combusted. The remaining air flows around the combustor 8 and flows from the attenuating air inlets 12 into the combustor 8. The combustion gas generated in the combustor 8 flows from the discharge outlet 13 of the combustor 8 into the high pressure turbine 5H.

The high pressure turbine 5H converts a part of the energy contained in the combustion gas into rotational energy, and transmits this rotational energy to the high pressure compressor 3H. The combustion gas that has rotated the high pressure turbine 5H flows from the high pressure turbine 5H into the low pressure turbine 5L. The low pressure turbine 5L converts a further part of the energy contained in the combustion gas into rotational energy, and transmits this rotational energy to the low pressure compressor 3L. The combustion gas that has rotated the low pressure turbine 5L is injected from the low pressure turbine 5L to the rear of the gas turbine engine 1.

Next, there is described an operation of the fuel nozzle section that characterizes the present embodiment.

First, there is described a state where fuel is injected from the fuel nozzle 15.

As shown in FIG. 3, the controller 21 outputs a control signal for opening the flow control valve 20 so as to open the flow control valve 20. When the flow control valve 20 has been opened, the fuel which has been raised in pressure by the fuel pump 19, flows into the circulation flow passage 16 (supplying step).

At the same time, the controller 21 outputs a drive signal to the circulation pump 18, thereby circulating the fuel within the circulation flow passage 16 counterclockwise in FIG. 3 (circulating step).

Figure 5:
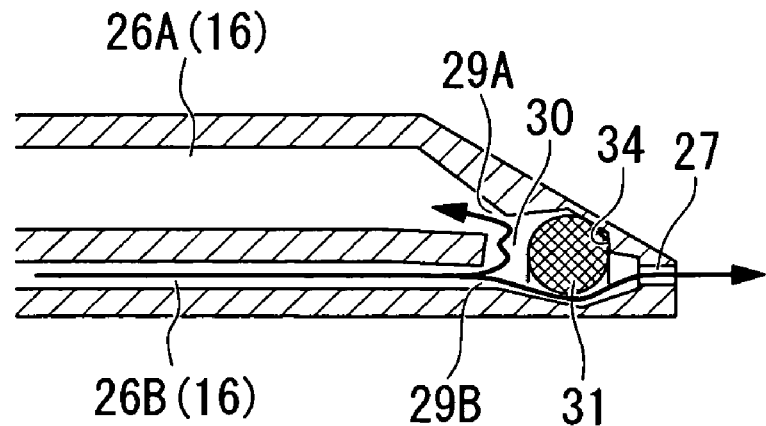
FIG. 5 is a schematic drawing for explaining fuel flow at the time when fuel is injected in FIG. 4.

FIG. 5 is a schematic drawing for explaining fuel flow at the time when fuel is injected in FIG. 4.

As shown in FIG. 3 and FIG. 5, having been cooled down by the heat radiator 17, the fuel travels from the inside flow passage 26B through the opening section 29B, the throat section 30, and the opening section 29A so as to flow into the outside flow passage 26A, and is sent to the inside flow passage 26B again by the circulation pump 18.

The pressure (total pressure) of the fuel in the throat section 30, the opening section 29A, and the opening section 29B is higher than the pressure outside the injection nozzle 27, because the fuel which has been raised in pressure by the fuel pump 19, is supplied and the static pressure of the fuel has risen. Consequently, the built-in valve 31 moves towards the injection nozzle 27 side due to the pressure difference, and comes in contact with the contact face 34. At this time, a gap that serves as a fuel flow passage is formed in between the built-in valve 31 and the inner circumferential face 33. A part of the fuel that has traveled through the inside flow passage 26B flows from the opening section 29B into the valve chamber 32, and is then injected through the injection nozzle 27 into the combustor 8. The remaining fuel flows from the opening section 29B into the throat section 30 and the opening section 29A, and continues to circulate within the circulation flow passage 16.

Here, the quantity of the fuel injected from the injection nozzle 27 is equivalent to that of the fuel that has traveled through the flow control valve 20 and has flowed into the circulation flow passage 16.

Next, there is described a state where fuel injection from the fuel nozzle 15 is stopped.

As shown in FIG. 3, in the case of stopping fuel injection, the controller 21 outputs a control signal for closing the flow control valve 20. Consequently, the flow control valve 20 is closed, and the inflow of fuel from the fuel pump 19 into the circulation flow passage 16 is stopped (supplying step).

At the same time, the controller 21 outputs a drive signal to the circulation pump 18, thereby circulating the fuel within the circulation flow passage 16 clockwise in FIG. 3 (circulating step).

Figure 6:
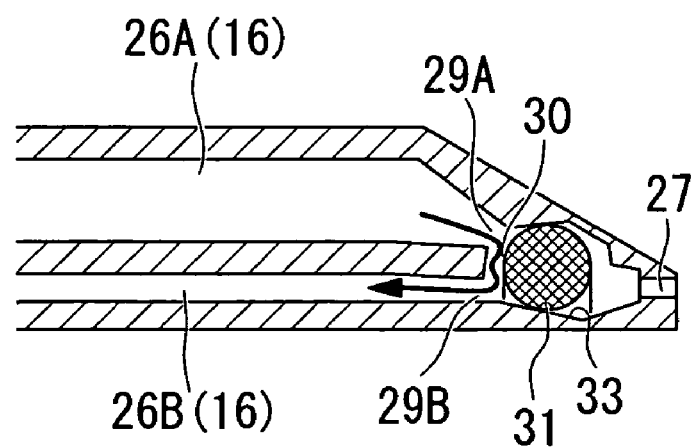
FIG. 6 is a schematic drawing for explaining fuel flow at the time when fuel injection is stopped in FIG. 3.

FIG. 6 is a schematic drawing for explaining fuel flow in FIG. 3 at the time when fuel injection is stopped.

As shown in FIG. 3 and FIG. 6, the fuel travels from the outside flow passage 26A through the opening section 29A, the throat section 30, and the opening section 29B so as to flow into the inside flow passage 26B, and after being cooled down by the heat radiator 17, the fuel is sent to the outside flow passage 26A again by the circulation pump 18.

The pressure (total pressure) of the fuel in the throat section 30, the opening section 29A, and the opening section 29B is lower than that outside of the injection nozzle 27, because the supply of the fuel which has been raised in pressure by the fuel pump 19, has been stopped, the flow velocity of the fuel within the throat section 30 is high, and the dynamic pressure of the fuel has fallen. Consequently, the built-in valve 31 moves towards the throat section 30 side due to the pressure difference, and comes in contact with the inner circumferential face 33 of the valve chamber 32. As a result, the flow passage that links from the opening section 29A and the opening section 29B to the valve chamber 32 and the injection nozzle 27 is closed, and fuel injection from the injection nozzle 27 is stopped.

In the case where there is no need for circulating fuel within the circulation flow passage 16 for cooling down the fuel, for example when an amount of fuel to be injected is large, the circulation pump 18 may be stopped.

In the case where the air-fuel ratio exceeds a predetermined value, the controller 21 carries out a control (staging) to stop fuel injection in some of the fuel nozzle apparatuses 10 and to continue fuel injection in the remaining fuel nozzle apparatuses 10.

In the fuel nozzle apparatus 10 in which fuel injection is stopped, fuel circulation control is carried out as described above. Specifically, values for the opening of the flow control valve 20, for the revolution speed of the circulation pump 18, and so forth, are predetermined, and the control is carried out according to these predetermined values.

Furthermore, also immediately after the operation of the gas turbine engine 1 has been stopped, a control of fuel circulation may be carried out until the temperature of the fuel nozzle 15 becomes sufficiently low. A period of time for carrying out the fuel circulation control may be found by finding a period of time required for sufficiently lowering the temperature in a test before hand, or by measuring the temperature with a sensor or the like, but the configuration is not particularly limited to this.

According to the above configuration, the fuel is circulated within the circulation flow passage 16 by the circulation pump 18. By circulating the fuel, a rise in fuel temperature to a temperature at which carbonization of the fuel starts to occur can be prevented. Therefore, an occurrence of caulking in the fuel nozzle apparatus 10 can be prevented.

In particular, in the case where fuel injection from the injection nozzle 27 is stopped by the injection controller 28, carbonization of the fuel is prevented, thereby preventing an occurrence of caulking, whereas carbonization of the fuel can easily occur if the fuel is not circulated.

For example, fuel injection may be stopped in the case of staging for carrying out lean combustion where fuel injection is stopped in some of the plurality of the fuel nozzle apparatuses 10 while the gas turbine engine 1 is operated, or in the case where the operation of the gas turbine engine 1 is stopped.

The injection controller 28 controls an amount of fuel injection based only on the pressure difference. Therefore, the configuration of the injection controller 28 can be simplified. As a result, compared to a method of controlling an amount of fuel injection with use of an actuator or the like, the size and the weight of the fuel nozzle apparatus 10 can be reduced, and the heat resistance property of the injection controller 28 can be improved.

In the case where the pressure of the fuel within the circulation flow passage 16 is lower than the pressure outside the injection nozzle 27, the built-in valve 31 is pulled towards the circulation flow passage 16 side due to the above mentioned pressure difference. On the other hand, in the case where the pressure of the fuel within the circulation flow passage 16 is higher than the pressure outside the injection nozzle 27, the built-in valve 31 is pushed towards the injection nozzle 27 side due to the above mentioned pressure difference.

By making use of these movements of the built-in valve 31, the flow passage area for the fuel flowing into the injection nozzle 27 can be changed.

Since the flow passage area in the throat section 30 is narrow, if fuel is circulated within the circulation flow passage 16 in a state where new fuel is not being supplied into the circulation flow passage 16, the pressure of the fuel within the throat section 30 can become lower than the pressure outside the injection nozzle 27. On the other hand, if new fuel is supplied into the circulation flow passage 16, the pressure of the fuel within the throat section 30 can be made higher than the pressure outside the injection nozzle 27 regardless of whether fuel circulation is being carried out.

Therefore, the pressure within the throat section 30 can be controlled by controlling the flow rate of the fuel flowing into the circulation flow passage 16 and the flow rate of the fuel circulating in the circulation flow passage 16. As a result, movement of the built-in valve 31 can be controlled.

By lowering the temperature of the fuel flowing through the circulation flow passage 16 with use of the heat radiator 17, carbonization of the fuel, and an occurrence of caulking can be prevented.

By supplying fuel into the circulation flow passage 16 and stopping fuel circulation within the circulation flow passage 16, the pressure within the circulation flow passage 16 is made higher than the pressure outside the injection nozzle 27 and the supplied fuel can be injected from the injection nozzle 27. On the other hand, by supplying fuel into the circulation flow passage 16 and carrying out fuel circulation within the circulation flow passage 16, the pressure within the circulation flow passage 16 is made higher than the pressure outside the injection nozzle 27, and a part of the supplied fuel can be injected from the injection nozzle 27 and the remaining fuel can be circulated within the circulation flow passage 16. Furthermore, by stopping fuel supply into the circulation flow passage 16 and carrying out fuel circulation within the circulation flow passage 16, the pressure within the circulation flow passage 16 is made lower than the pressure outside the injection nozzle 27, fuel injection is stopped, and the fuel can be thereby circulated within the circulation flow passage 16.

In any one of these cases, the fuel flows within the circulation flow passage 16, and a rise in fuel temperature can therefore be prevented, and an occurrence of caulking can be prevented.

The circulation pump 18 circulates the fuel via the throat section 30 between the inside flow passage 26B and the outside flow passage 26A. By circulating the fuel, a rise in fuel temperature to a temperature at which carbonization of the fuel starts to occur can be prevented.

The built-in valve 31 is moved to the throat section 30 side and the injection nozzle 27 side due to the pressure difference between the pressure in the throat section 30 and the pressure outside the injection nozzle 27. Since the built-in valve 31 is formed in a toroidal shape, it is unlikely to move in the radial direction of the built-in valve 31 and a flow passage that leads a flow into the injection nozzle 27 can be easily formed.

Second Embodiment

Next, a gas turbine engine according to a second embodiment of the present invention is described, with reference to FIG. 7 to FIG. 12.

The basic configuration of the gas turbine engine of the present embodiment is similar to that of the first embodiment. However, it differs from that of the first embodiment in the configuration of the fuel nozzle apparatus. Therefore, in the present embodiment, only the surroundings of the fuel nozzle apparatus are described with reference to FIG. 7 to FIG. 12, and descriptions of other components are omitted.

Figure 7:
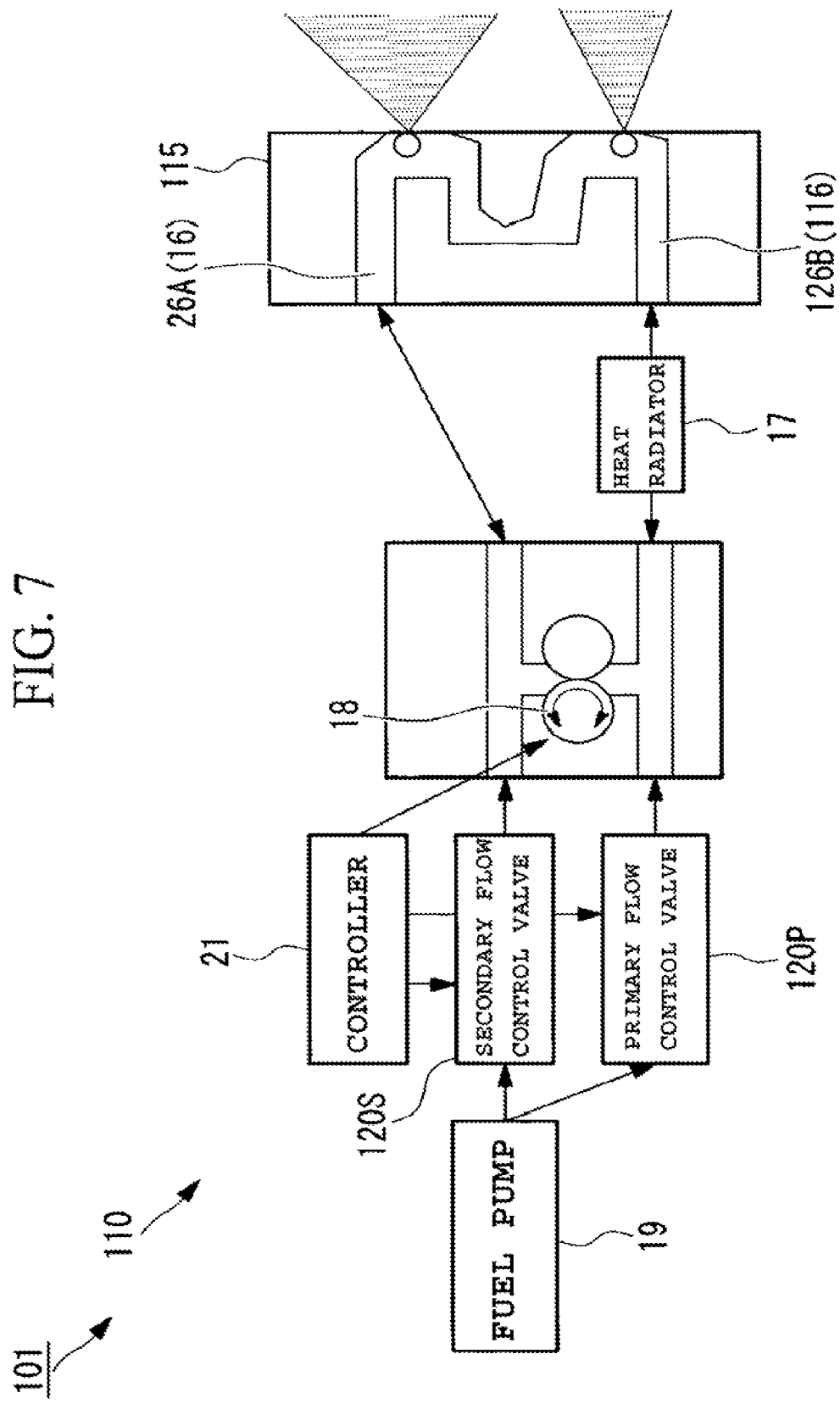
FIG. 7 is a schematic drawing for explaining an overview of a fuel nozzle apparatus to be used for a gas turbine engine according to a second embodiment of the present invention.

FIG. 7 is a schematic drawing for explaining an overview of the fuel nozzle apparatus to be used for the gas turbine engine according to the present embodiment.

Components the same as those in the first embodiment are denoted by same reference symbols, and the descriptions thereof are omitted.

As shown in FIG. 7, a fuel nozzle apparatus 110 of a gas turbine engine 101 comprises; a fuel nozzle 115, a circulation flow passage 116, a heat radiator 17, a circulation pump 18, a fuel pump 19, a primary flow control valve (primary flow controller) 120P, a secondary flow control valve (secondary flow controller) 120S, and a controller 21.

Figure 8:
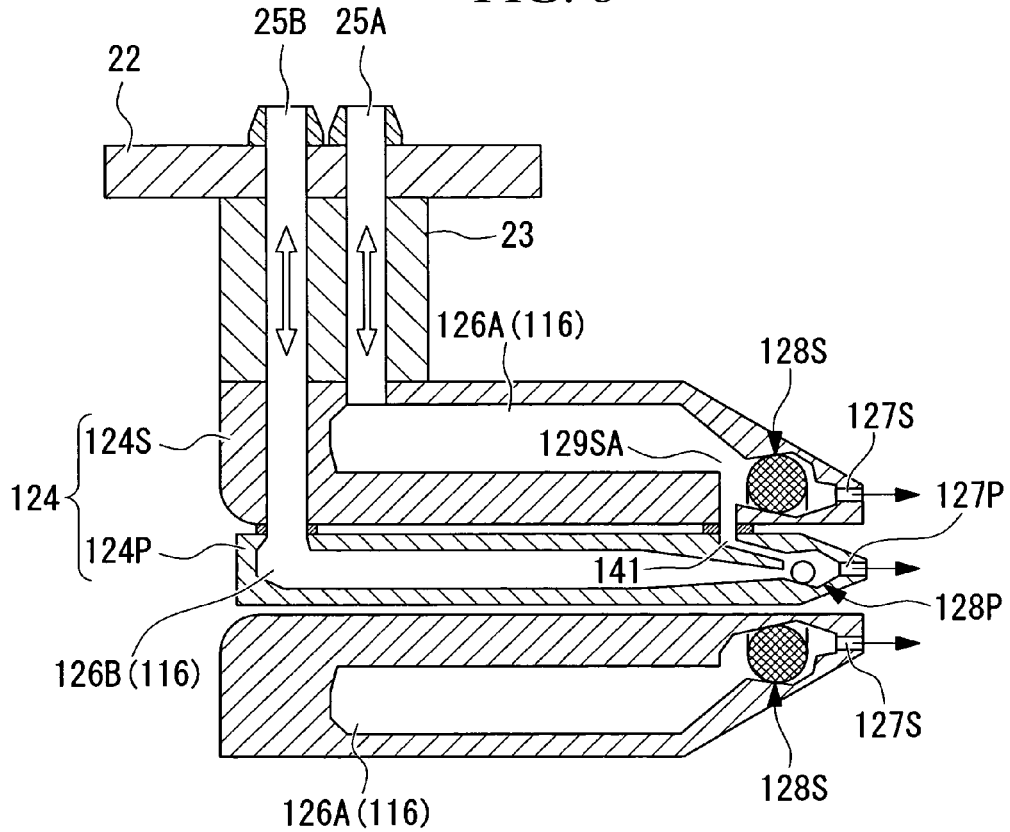
FIG. 8 is a schematic drawing for explaining a configuration of the fuel nozzle in FIG. 7.

FIG. 8 is a schematic drawing for explaining a configuration of the fuel nozzle in FIG. 7.

A plurality of the fuel nozzles 115 are arranged at even intervals on the circumference around the central axis of the gas turbine engine 101 (refer to FIG. 1).

As shown in FIG. 8, the fuel nozzle 115 comprises; a nozzle flange 22 serving as an attachment section, a nozzle stay 23 that joins the nozzle flange 22 to a nozzle main body 24, and the nozzle main body (nozzle section) 124 formed in a cylindrical shape.

The nozzle main body 124 is configured with a cylindrical body 124S formed in a cylindrical shape and a column-shaped column body 124P arranged inside the cylindrical body 124S, and is attached via the nozzle stay 23 to the nozzle flange 22.

The nozzle main body 124 comprises; an outside flow passage (circulation flow passage, fuel passage) 126A and an inside flow passage (circulation flow passage, fuel passage) 126B through which fuel travels, a primary injection nozzle 127P and a secondary injection nozzle 127S that inject the fuel, and a primary injection controller 128P and a secondary injection controller 128S that control fuel injection.

The outside flow passage 126A is a cylindrical flow passage formed within the cylindrical body 124S, and it, together with the inside flow passage 126B, forms the circulation flow passage 116. On the other hand, the inside flow passage 126B is a flow passage formed within the column body 124P of the nozzle main body 124, and it, together with the outside flow passage 126A, forms the circulation flow passage 116.

The outside flow passage 126A and the inside flow passage 126B, in the end section on the downstream side of the nozzle main body 124 (right side in FIG. 8), are communicated with each other by an orifice 141.

Figure 9:
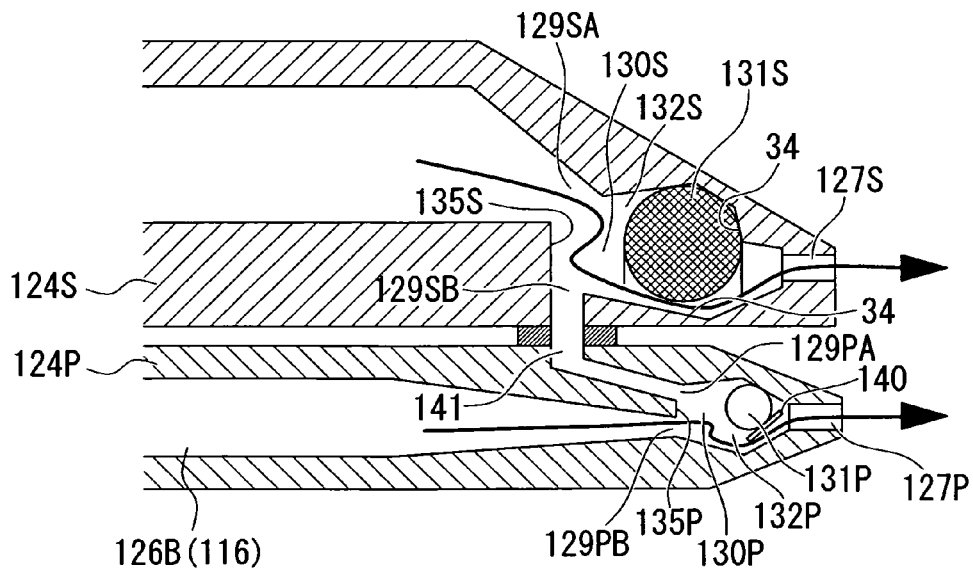
FIG. 9 is a schematic drawing for explaining fuel flow at the time when fuel is injected from a primary injection nozzle and a secondary injection nozzle in FIG. 8.

FIG. 9 is a schematic drawing for explaining fuel flow at the time when fuel is injected from the primary injection nozzle and the secondary injection nozzle in FIG. 8.

As shown in FIG. 8 and FIG. 9, the primary injection nozzle 127P is a hole formed in a downstream side end face of the column body 124P, and the fuel is injected therethrough. The primary injection nozzle 127P is arranged so that the fuel that has traveled through the inside flow passage 126B flows thereinto via an opening section 129PB and a valve chamber 132P.

The secondary injection nozzle 127S is a hole formed in a downstream side end face of the cylindrical body 124S, and the fuel is injected therethrough. The secondary injection nozzle 127S is arranged so that the fuel that has traveled through the outside flow passage 126A flows thereinto via an opening section 129SA and a valve chamber 132S.

As shown in FIG. 8 and FIG. 9, the primary injection controller 128P comprises; a primary built-in valve (primary valve element) 131P that changes the flow passage area for the fuel flowing into the primary injection nozzle 127P, and the valve chamber 132P.

The valve chamber 132P houses the primary built-in valve 131P therein, while forming a flow passage that links an opening section 129PA, a primary throat section 130P and the opening section 129PB with the primary injection nozzle 127P.

The primary built-in valve 131P is a member formed in a substantially spherical shape, and is a member formed from a metallic material.

The valve chamber 132P is formed in a shape where the sectional area becomes smaller towards the primary throat section 130P side (left side in FIG. 8). In the valve chamber 132P, when the primary built-in valve 131P moves to the primary throat section 130P side, the valve chamber 132P and the primary throat section 130P are separated from each other by the built-in valve 131P.

Inside the valve chamber 132P, on the primary injection nozzle 127P side, there is a gap retaining section 140 that retains the primary built-in valve 131P to ensure a flow passage for the fuel flowing into the primary injection nozzle 127P.

The opening section 129PA is a flow passage that links the orifice 141 with the primary throat section 130P, and the opening section 129PB is a flow passage that links the inside flow passage 126B with the valve chamber 132P and the primary throat section 130P.

The primary throat section 130P is a flow passage formed by a throat wall section 135P and the primary built-in valve 131P. One of the end sections thereof links to the opening section 129PA and the other end section links to the opening section 129PB and the valve chamber 132P.

The secondary injection controller 128S comprises; a secondary built-in valve (secondary valve element) 131S that changes the flow passage area for the fuel flowing into the secondary injection nozzle 127S, and the valve chamber 132S.

The valve chamber 132S houses the secondary built-in valve 131S therein, while forming a flow passage that links an opening section 129SA, a secondary throat section 130S and an opening section 129SB, with the secondary injection nozzle 127S.

The secondary built-in valve 131S is a member formed in a toroidal shape with a cross-section of a substantially circular shape, and is a member formed from a metallic material.

An inner circumferential face 33 serving as a face on the central axis side of the nozzle main body 124 in the valve chamber 132S, is formed at an incline so as to approach the central axis side towards the secondary injection nozzle 127S side. In the secondary injection nozzle 127S side end section in the valve chamber 132S, there is formed a contact face 34 that regulates movement of the secondary built-in valve 131S. In the valve chamber 132S there is ensured a space within which the secondary built-in valve 131S is able to move in a direction along the central axis of the nozzle main body 124.

The valve chamber 132S may comprise a guide section that makes the built-in valve 131S move in parallel with the central axis of the nozzle main body 124, but the configuration is not particularly limited to this.

The opening section 129SA is a flow passage that links the outside flow passage 126A, the valve chamber 132S, and the secondary throat section 130S, and the opening section 129SB is a flow passage that communicates the orifice 141 with the secondary throat section 130S.

The secondary throat section 130S is a flow passage formed by a throat wall section 135S and the secondary built-in valve 131S, and one of the end sections thereof links to the opening section 129SA and the other end section links to the opening section 129SB and the valve chamber 132S.

As shown in FIG. 7, the primary flow control valve 120P is a valve that controls the flow rate of the fuel which has been raised in pressure by the fuel pump 19, and flows into the circulation flow passage 116. The primary flow control valve 120P is controlled based on control signals inputted from the controller 21 so as to control the flow rate of the fuel that passes through the primary flow control valve 120P regardless of the outlet pressure thereof. The fuel that has passed through the primary flow control valve 120P flows into between the circulation pump 18 and the inside flow passage 126B.

As shown in FIG. 7, the secondary flow control valve 120S is a valve that controls the flow rate of the fuel which has been raised in pressure by the fuel pump 19, and flows into the circulation flow passage 116. The secondary flow control valve 120S is controlled based on control signals inputted from the controller 21 so as to control the flow rate of the fuel that passes through the secondary flow control valve 120S regardless of the outlet pressure thereof. The fuel that has passed through the secondary flow control valve 120S flows into between the circulation pump 18 and the outside flow passage 126A.

Next, there is described an operation of the fuel nozzle section that characterizes the present embodiment.

The operation of the gas turbine engine 101 according to the present embodiment is the same as in the first embodiment, and description thereof is omitted.

First, there is described a state where fuel is injected from the primary injection nozzle 127P and the secondary injection nozzle 127S.

As shown in FIG. 7, the controller 21 outputs a control signal for opening the primary flow control valve 120P and the secondary flow control valve 120S so as to open the primary flow control valve 120P and the secondary flow control valve 120S. When the primary flow control valve 120P and the secondary flow control valve 120S have been opened, the fuel which has been raised in pressure by the fuel pump 19, flows into the circulation flow passage 116 (supplying step).

Specifically, the fuel that has passed through the primary flow control valve 120P flows into the inside flow passage 126B, and the fuel that has passed through the secondary flow control valve 120S flows into the outside flow passage 126A.

The pressure (total pressure) of the fuel in the primary throat section 130P, the opening section 129PA, and the opening section 129PB is higher than the pressure outside the primary injection nozzle 127P, because the fuel which has been raised in pressure by the fuel pump 19, is supplied and the static pressure of the fuel has risen. Consequently, the primary built-in valve 131P moves to the primary injection nozzle 127P side due to the pressure difference, and comes in contact with the gap retaining section 140. At this time, a gap that serves as a fuel flow passage is formed in between the primary built-in valve 131P and the gap retaining section 140. A part of the fuel that has traveled through the inside flow passage 26A flows from the opening section 129PB into the valve chamber 132P, and is injected through the primary injection nozzle 127P.

The pressure (total pressure) of the fuel in the secondary throat section 130S, the opening section 129SA, and the opening section 129SB is higher than the pressure outside the secondary injection nozzle 127S, because the fuel which has been raised in pressure by the fuel pump 19, is supplied and the static pressure of the fuel has risen. Consequently, the secondary built-in valve 131S moves to the secondary injection nozzle 127S side due to the pressure difference, and comes in contact with the contact face 34. At this time, a gap that serves as a fuel flow passage is formed in between the secondary built-in valve 131S and the inner circumferential face 33. A part of the fuel that has traveled through the outside flow passage 126A flows from the opening section 129SA into the valve chamber 132S, and is injected through the secondary injection nozzle 127S.

At this same time, the controller 21 outputs a drive signal to the circulation pump 18, thereby circulating the fuel within the circulation flow passage 116 (circulating step).

By circulating the fuel, a pressure difference is made in the orifice 141 when carrying out fuel injection separately from the primary injection nozzle 127P and the secondary injection nozzle 127S.

Next, there is described a state where fuel is injected from the secondary injection nozzle 127S and fuel injection from the primary injection nozzle 127P is stopped.

As shown in FIG. 7, the controller 21 outputs a control signal for opening the secondary flow control valve 120S and outputs a control signal for closing the primary flow control valve 120P. Consequently, the fuel which has been raised in pressure by the fuel pump 19, travels through the secondary flow control valve 120S and flows into the outside flow passage 126A (supplying step).

At the same time, the controller 21 outputs a drive signal to the circulation pump 18, thereby circulating the fuel within the circulation flow passage 116 (circulating step).

Accordingly, a circulation flow that flows from the circulation pump 18 through the outside flow passage 126A and the orifice 141 into the inside flow passage 126B is formed within the circulation flow passage 116.

Figure 10:
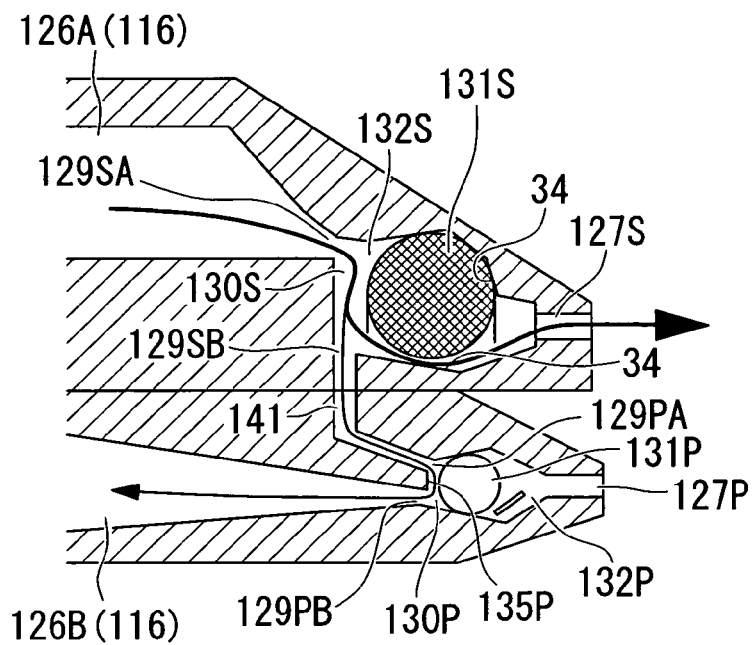
FIG. 10 is a schematic drawing for explaining fuel flow at the time when fuel is injected from the secondary injection nozzle and fuel injection from the primary injection nozzle is stopped in FIG. 8.

FIG. 10 is a schematic drawing for explaining fuel flow at the time when fuel is injected from the secondary injection nozzle, and fuel injection from the primary injection nozzle is stopped in FIG. 8.

The pressure (total pressure) of the fuel in the secondary throat section 130S, the opening section 129SA, and the opening section 129SB is higher than the pressure outside the secondary injection nozzle 127S, because the fuel which has been raised in pressure in the outside flow passage 126A, is supplied and the static pressure of the fuel has risen. Consequently, the secondary built-in valve 131S moves to the secondary injection nozzle 127S side due to the pressure difference, and a gap that serves as a fuel flow passage is formed. A part of the fuel that has traveled through the outside flow passage 126A flows from the secondary throat section 130S into the valve chamber 132S, and is injected through the secondary injection nozzle 127S. The remaining fuel travels from the secondary throat section 130S through the opening section 129SB, the orifice 141, the opening section 129PA, the primary throat section 130P, and the opening section 129PB, and into the inside flow passage 126B, and continues to circulate within the circulation flow passage 116.

The pressure (total pressure) of the fuel in the primary throat section 130P, the opening section 129PA, and the opening section 129PB is lower than the pressure outside the primary injection nozzle 127P, because the fuel supply into the inside flow passage 126B has been stopped and the dynamic pressure of the fuel in the primary throat section 130P has become lower. Consequently, the primary built-in valve 131P moves to the primary throat section 130P side due to the pressure difference, and comes in contact with the wall face of the valve chamber 132P. Therefore, the flow passage that links the opening section 129PA and the opening section 129PB to the valve chamber 132P and the primary injection nozzle 127P is closed, and fuel injection from the primary injection nozzle 127P is stopped.

Next, there is described a state where fuel is injected from the primary injection nozzle 127P, and fuel injection from the secondary injection nozzle 127S is stopped.

As shown in FIG. 7, the controller 21 outputs a control signal for opening the primary flow control valve 120P and outputs a control signal for closing the secondary flow control valve 120S. Consequently, the fuel which has been raised in pressure by the fuel pump 19, travels through the primary flow control valve 120P and flows into the inside flow passage 126B (supplying step).

At the same time, the controller 21 outputs a drive signal to the circulation pump 18, thereby circulating the fuel within the circulation flow passage 116 (circulating step).

Accordingly, a circulation flow that flows from the circulation pump 18 through the inside flow passage 126B and the orifice 141 into the outside flow passage 126A is formed within the circulation flow passage 116.

Figure 11:
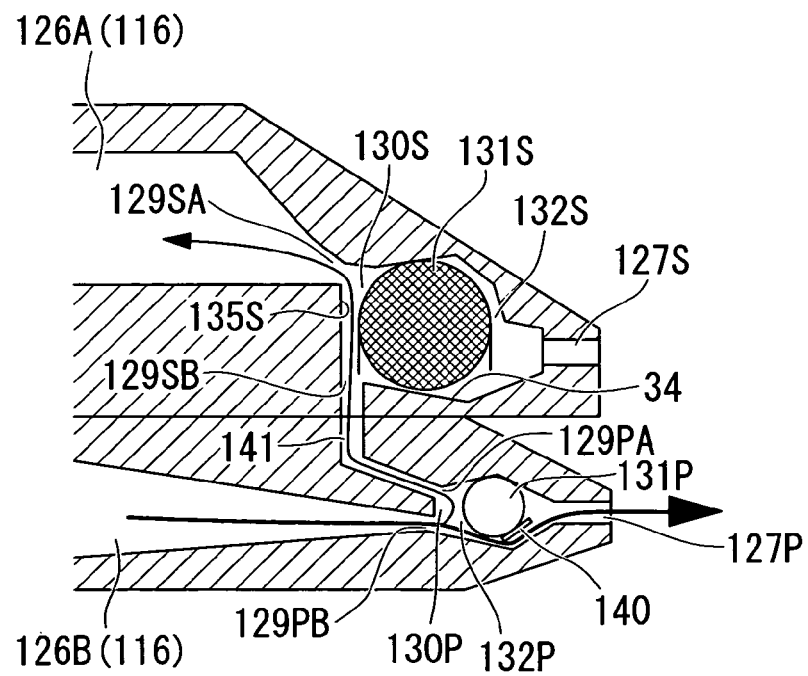
FIG. 11 is a schematic drawing for explaining fuel flow at the time when fuel is injected from the primary injection nozzle and fuel injection from the secondary injection nozzle is stopped in FIG. 8.

FIG. 11 is a schematic drawing for explaining fuel flow at the time when fuel is injected from the primary injection nozzle, and fuel injection from the secondary injection nozzle is stopped in FIG. 8.

The pressure (total pressure) of the fuel in the primary throat section 130P, the opening section 129PA, and the opening section 129PB is higher than the pressure outside the primary injection nozzle 127P, because the fuel which has been raised in pressure in the inside flow passage 126B, is supplied and the static pressure of the fuel has risen. Consequently, the primary built-in valve 131P moves to the primary injection nozzle 127P side due to the pressure difference, and a gap that serves as a fuel flow passage is formed. A part of the fuel that has traveled through the inside flow passage 126B flows from the primary throat section 130P into the valve chamber 132P, and is injected through the primary injection nozzle 127P. The remaining fuel travels from the primary throat section 130P through the opening section 129PA, the orifice 141, the opening section 129SB, the secondary throat section 130S, and the opening section 129SA, and into the outside flow passage 126A, and continues to circulate within the circulation flow passage 116.

The pressure (total pressure) of the fuel in the secondary throat section 130S, the opening section 129SA, and the opening section 129SB is lower than the pressure outside the secondary injection nozzle 127S, because the fuel supply into the outside flow passage 126A has been stopped and the dynamic pressure of the fuel in the secondary throat section 130S has become lower. Consequently, the secondary built-in valve 131S moves to the secondary throat section 130S side due to the pressure difference, and comes in contact with the wall face of the valve chamber 132S. Therefore, the flow passage that links the opening section 129SA and the opening section 129SB to the valve chamber 132S and the secondary injection nozzle 127S is closed, and fuel injection from the secondary injection nozzle 127S is stopped.

Finally, there is described a state where fuel injection from the primary injection nozzle 127P and the secondary injection nozzle 127S is stopped.

As shown in FIG. 7, the controller 21 outputs control signals for closing the primary flow control valve 120P and for closing the secondary flow control valve 120S. Consequently, the flow of the fuel which has been raised in pressure by the fuel pump 19, into the circulation flow passage 116 is stopped (supplying step).

At the same time, the controller 21 outputs a drive signal to the circulation pump 18, thereby circulating the fuel within the circulation flow passage 116 (circulating step).

Figure 12:
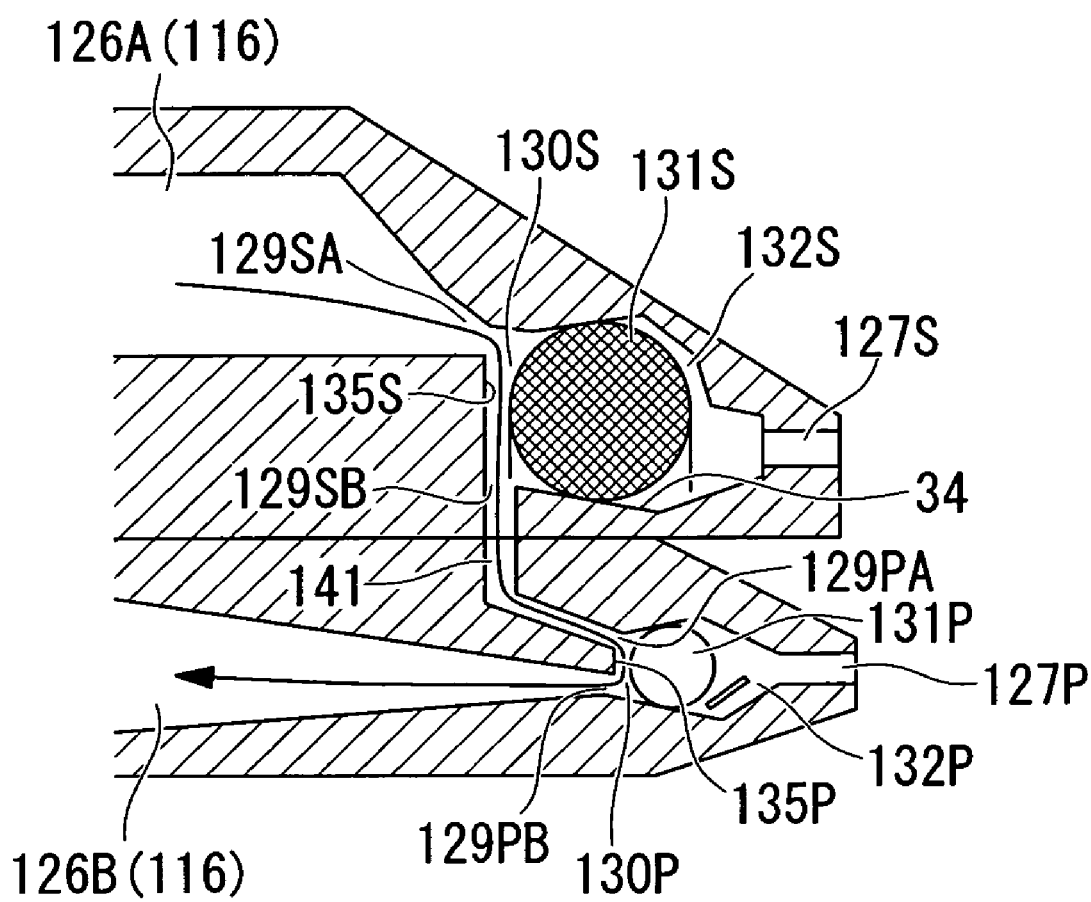
FIG. 12 is a schematic drawing for explaining fuel flow at the time when fuel injection from the primary injection nozzle and the secondary injection nozzle is stopped in FIG. 8.

FIG. 12 is a schematic drawing for explaining fuel flow at the time when fuel injection from the primary injection nozzle and the secondary injection nozzle is stopped in FIG. 8.

Accordingly, a circulation flow that flows from the circulation pump 18 through the outside flow passage 126A, the opening section 129SA, the secondary throat section 130S, the opening section 129SB, the orifice 141, the opening section 129PA, the primary throat section 130P, and the opening section 129PB, and into the inside flow passage 126B, is formed within the circulation flow passage 116.

The pressure (total pressure) of the fuel in the orifice 141, the primary throat section 130P, the opening section 129PA, and the opening section 129PB is lower than the pressure outside the primary injection nozzle 127P, because the fuel supply into the inside flow passage 126B has been stopped and the dynamic pressure of the fuel in the primary throat section 130P has become lower. Consequently, the primary built-in valve 131P moves to the primary throat section 130P side due to the pressure difference, and comes in contact with the wall face of the valve chamber 132P. Therefore, the flow passage that links the opening section 129PA and the opening section 129PB to the valve chamber 132P and the primary injection nozzle 127P is closed, and fuel injection from the primary injection nozzle 127P is stopped.

The pressure (total pressure) of the fuel in the secondary throat section 130S, the opening section 129SA, and the opening section 129SB is lower than the pressure outside the secondary injection nozzle 127S, because the fuel supply into the outside flow passage 126A has been stopped and the dynamic pressure of the fuel in the secondary throat section 130S has become lower. Consequently, the secondary built-in valve 131S moves to the secondary throat section 130S side due to the pressure difference, and comes in contact with the wall face of the valve chamber 132S. Therefore, the flow passage that links the opening section 129SA and the opening section 129SB to the valve chamber 132S and the secondary injection nozzle 127S is closed, and fuel injection from the secondary injection nozzle 127S is stopped.

As with the case of the first embodiment, in the case where the air-fuel ratio exceeds a predetermined value, the controller 21 carries out a control (staging) to stop fuel injection in some of the fuel nozzle apparatuses 110 and to continue fuel injection in the remaining fuel nozzle apparatuses 110. In the fuel nozzle apparatus 10 in which fuel injection is stopped, fuel circulation control is carried out as described above.

Furthermore, control is made according to a fuel injection amount, as to whether to inject fuel: from the primary injection nozzle 127P; from the secondary injection nozzle 127S; or from the primary injection nozzle 127P and the secondary injection nozzle 127S, of the fuel nozzle apparatus 110.

According to the above configuration, the fuel is circulated between the outside flow passage 126A and the inside flow passage 126B by the circulation pump 18. By circulating the fuel, a rise in fuel temperature to a temperature at which carbonization of the fuel starts to occur can be prevented.

Since the flow passage area in the primary throat section 130P is narrow, if fuel is circulated between the inside flow passage 126B and the outside flow passage 126A in a state where fuel is not being supplied from the fuel pump 19 into the inside flow passage 126B, the pressure of the fuel within the primary throat section 130P becomes lower than the pressure outside the primary injection nozzle 127P. On the other hand, if the fuel is supplied from the fuel pump 19 into the inside flow passage 126B, the pressure of the fuel in the primary throat section 130P becomes higher than the pressure outside the primary injection nozzle 127P regardless of whether fuel circulation is being carried out.

Therefore, by controlling the amount of fuel flowing into the inside flow passage 126B and the amount of fuel circulating between the inside flow passage 126B and the outside flow passage 126A, the pressure within the primary throat section 130P can be controlled and movement of the primary built-in valve 131P can be controlled.

On the other hand, since the flow passage area in the secondary throat section 130S is narrow, if fuel is circulated between the outside flow passage 126A and the inside flow passage 126B in a state where fuel is not being supplied from the fuel pump 19 into the outside flow passage 126A, the pressure of the fuel within the secondary throat section 130S becomes lower than the pressure outside the secondary injection nozzle 127S. On the other hand, if the fuel is supplied from the fuel pump 19 into the outside flow passage 126A, the pressure of the fuel in the secondary throat section 130S becomes higher than the pressure outside the secondary injection nozzle 127S regardless of whether fuel circulation is being carried out.

Therefore, by controlling the amount of fuel flowing into the outside flow passage 126A and the amount of fuel circulating between the outside flow passage 126A and the inside flow passage 126B, the pressure within the secondary throat section 130S can be controlled and movement of the secondary built-in valve 131S can be controlled.

What is claimed is:
1. A fuel nozzle apparatus comprising:
  a fuel pump that is configured to feed fuel;
  a fuel flow passage having a circulation flow passage through which the fuel is capable of flowing;

a flow controller configured to control a flow rate of the fuel flowing from said fuel pump into said circulation flow passage;
a circulation pump configured to circulate the fuel within said circulation flow passage;
a nozzle section having an injection nozzle configured to inject the fuel from said circulation flow passage to the outside; and
an injection controller configured to control an injection amount of the fuel to be injected from said injection nozzle;
wherein said injection controller comprises a valve element arranged in between said circulation flow passage and said injection nozzle,
said valve element is configured to move to said circulation flow passage side or said injection nozzle side on the basis of a pressure difference between a pressure within said circulation flow passage and a pressure outside said injection nozzle, thereby changing a flow passage area for said fuel flowing into said injection nozzle,
said circulation flow passage adjacent to said valve element comprises a throat section in which a flow passage area becomes narrower,
a pressure within said throat section is controlled based on a flow rate of said fuel flowing into said circulation flow passage and a flow rate of said fuel circulating in said circulation flow passage,
said circulation flow passage comprises two cylindrical flow passages, said two cylindrical flow passages are an inside flow passage and an outside flow passage, and are connected to said throat section, and radiuses of said inside flow passage and said outside flow passage are different from each other,
and
said valve element is arranged between said throat section and said injection nozzle, and has a toroidal shape with a cross-section of a substantially circular shape.

2. A fuel nozzle apparatus according to claim 1, wherein said circulation flow passage comprises a cooling section configured to cool down the fuel flowing inside said circulation flow passage.

3. A gas turbine comprising:
a compressor section configured to compress air;
a combustion section comprising a fuel nozzle apparatus according to claim 1, configured to inject fuel into the compressed air, and to combust the injected fuel therein; and
a turbine section configured to extract a rotational force from combustion gas and rotationally drives said compressor section.

4. A fuel nozzle apparatus comprising:
a fuel pump that is configured to feed fuel;
a fuel flow passage having a circulation flow passage through which the fuel is capable of flowing;
a flow controller configured to control a flow rate of the fuel flowing from said fuel pump into said circulation flow passage;
a circulation pump configured to circulate the fuel within said circulation flow passage;
a nozzle section having an injection nozzle configured to inject the fuel from said circulation flow passage to the outside; and
an injection controller configured to control an injection amount of the fuel to be injected from said injection nozzle;
wherein said injection controller is capable of changing a flow passage area for the fuel flowing into said injection nozzle, on the basis of a pressure difference between a pressure within said circulation flow passage and a pressure outside said injection nozzle, thereby controlling an injection amount of the fuel;
said circulation flow passage is formed by connecting a outside flow passage with an inside flow passage arranged inside of said outside flow passage;
said flow controller comprises a primary flow control valve configured to control a flow rate of the fuel flowing into said inside flow passage, and a secondary flow control valve configured to control a flow rate of the fuel flowing into said outside flow passage;
said nozzle section comprises a primary injection nozzle configured to communicate with said inside flow passage, and a secondary injection nozzle configured to communicate with said outside flow passage;
said injection controller comprises a primary valve element arranged in between said primary injection nozzle and said inside flow passage, and a secondary valve element arranged in between said secondary injection nozzle and said outside flow passage;
said primary valve element is configured to move to said inside flow passage side or said primary injection nozzle side based on a pressure difference between a pressure within said inside flow passage and a pressure outside said primary injection nozzle, thereby changing a flow passage area for the fuel flowing into said primary injection nozzle; and
said secondary valve element is configured to move to said outside flow passage side or said secondary injection nozzle side based on a pressure difference between a pressure within said outside flow passage and a pressure outside said secondary injection nozzle, thereby changing a flow passage area for the fuel flowing into said secondary injection nozzle.

5. A fuel nozzle apparatus according to claim 4, wherein:
a primary throat section in which a flow passage area becomes narrower is between said primary valve element and said inside flow passage;
a secondary throat section in which a flow passage area becomes narrower is between said secondary valve element and said outside flow passage;
a pressure within said primary throat section is capable of being controlled based on a flow rate of the fuel flowing into said inside flow passage and a flow rate of the fuel circulating within said circulation flow passage; and
a pressure within said secondary throat section is capable of being controlled based on a flow rate of the fuel flowing into said outside flow passage and a flow rate of the fuel circulating within said circulation flow passage.

6. A fuel nozzle apparatus according to claim 4, wherein said circulation flow passage comprises a cooling section configured to cool down the fuel flowing inside said circulation flow passage.

7. A gas turbine comprising:
a compressor section configured to compress air;
a combustion section comprising a fuel nozzle apparatus according to claim 4, configured to inject fuel into the compressed air, and to combust the injected fuel therein; and
a turbine section configured to extract a rotational force from combustion gas and rotationally drives said compressor section.

8. A method of controlling a fuel nozzle apparatus comprising:

a circulation flow passage into which fuel is externally supplied, and which is configured to enable circulation of the supplied fuel;
an injection nozzle that communicates with the circulation flow passage and injects the fuel within the circulation flow passage towards the outside; and
an injection controller that is arranged in between the circulation flow passage and the injection nozzle so as to change a flow passage area for fuel flowing into the injection nozzle due to a pressure difference between a pressure within the circulation flow passage and a pressure outside the injection nozzle,
said method comprising:
controlling fuel supply into the circulation flow passage; and
controlling circulation of said fuel within the circulation flow passage;
wherein the injection controller comprises a valve element arranged in between the circulation flow passage and the injection nozzle,
the valve element moves to the circulation flow passage side or the injection nozzle side on the basis of a pressure difference between a pressure within the circulation flow passage and the pressure outside the injection nozzle, thereby changing a flow passage area for the fuel flowing into injection nozzle,
said circulation flow passage adjacent to said valve element comprises a throat section in which a flow passage area becomes narrower,
a pressure within said throat section is controlled based on a flow rate of said fuel flowing into said circulation flow passage and a flow rate of said fuel circulating in said circulation flow passage,
said circulation flow passage comprises two cylindrical flow passages, said two cylindrical flow passages are an inside flow passage and an outside flow passage, and are connected to said throat section, and radiuses of said inside flow passage and said outside flow passage are different from each other,
and
said valve element is arranged between said throat section and said injection nozzle, and has a toroidal shape with a cross-section of a substantially circular shape.

9. A method of controlling a fuel nozzle apparatus comprising:
a circulation flow passage into which fuel is externally supplied, and which is configured so as to enable circulation of the supplied fuel;
an injection nozzle that communicates with the circulation flow passage and injects the fuel within the circulation flow passage towards the outside; and
an injection controller that is arranged in between the circulation flow passage and the injection nozzle to change a flow passage area for fuel flowing into the injection nozzle due to a pressure difference between a pressure within the circulation flow passage and a pressure outside the injection nozzle,
the method comprising:
controlling fuel supply into the circulation flow passage; and
controlling circulation of the fuel within the circulation flow passage;
wherein the circulation flow passage is formed by connecting a outside flow passage with an inside flow passage arranged inside of the outside flow passage;
the flow controller comprises a primary flow control valve that controls a flow rate of the fuel flowing into the inside flow passage, and a secondary flow control valve that controls a flow rate of the fuel flowing into the outside flow passage;
the injection nozzle comprises a primary injection nozzle and a secondary injection nozzle, the primary injection nozzle communicating with the inside flow passage, and the secondary injection nozzle communicating with the outside flow passage;
the injection controller comprises a primary valve element arranged in between the primary injection nozzle and the inside flow passage, and a secondary valve element arranged in between the secondary injection nozzle and the outside flow passage;
the primary valve element moves to the inside flow passage side or the primary injection nozzle side based on a pressure difference between a pressure within the inside flow passage and a pressure outside the primary injection nozzle, thereby changing a flow passage area for the fuel flowing into the primary injection nozzle; and
the secondary valve element moves to the outside flow passage side or the secondary injection nozzle side based on a pressure difference between a pressure within the outside flow passage and a pressure outside the secondary injection nozzle, thereby changing a flow passage area for the fuel flowing into the secondary injection nozzle.

10. A fuel nozzle apparatus comprising:
a fuel pump that is configured to feed fuel;
a fuel flow passage having a circulation flow passage through which the fuel is capable of flowing;
a flow controller configured to control a flow rate of the fuel flowing from said fuel pump into said circulation flow passage;
a circulation pump configured to circulate the fuel within said circulation flow passage;
a nozzle section having an injection nozzle configured to inject the fuel from said circulation flow passage to the outside; and
an injection controller configured to control an injection amount of the fuel to be injected from said injection nozzle;
wherein said injection controller comprises a valve element arranged in between said circulation flow passage and said injection nozzle,
said circulation flow passage is adjacent to said valve element and comprises a throat section in which a flow passage area becomes narrower,
a pressure within said throat section is controlled based on a flow rate of said fuel flowing into said circulation flow passage and a flow rate of said fuel circulating in said circulation flow passage,
said circulation flow passage comprises two cylindrical flow passages, said two cylindrical flow passages are an inside flow passage and an outside flow passage, and are connected to said throat section, and radiuses of said inside flow passage and said outside flow passage are different from each other,
and
said valve element is arranged between said throat section and said injection nozzle, and has a toroidal shape with a cross-section of a substantially circular shape.

* * * * *